US009983886B2

(12) United States Patent
Anbazhagan et al.

(10) Patent No.: US 9,983,886 B2
(45) Date of Patent: May 29, 2018

(54) UPDATING BOOT CODE (71) Applicant: HEWLETT-PACKARD DEVELOPMENT COMPANY, L.P., Houston, TX (US)

(72) Inventors: Baraneedharan Anbazhagan, Houston, TX (US); Christopher H Stewart, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days. days.

(21) Appl. No.: 14/892,223

(22) PCT Filed: Jul. 31, 2013

(86) PCT No.: PCT/US2013/052882
§ 371 (c)(1),
(2) Date: Nov. 19, 2015

(87) PCT Pub. No.: WO2015/016867
PCT Pub. Date: Feb. 5, 2015

(65) Prior Publication Data
US 2016/0085558 A1  Mar. 24, 2016

(51) Int. Cl.
*G06F 9/44* (2018.01)
*G06F 21/57* (2013.01)
*G06F 12/14* (2006.01)
*G06F 9/445* (2018.01)

(52) U.S. Cl.
CPC ............ *G06F 9/4401* (2013.01); *G06F 8/665* (2013.01); *G06F 12/1458* (2013.01); *G06F 21/572* (2013.01); *G06F 2212/1052* (2013.01)

(58) Field of Classification Search
CPC ......... G06F 12/1458; G06F 2212/1052; G06F 8/665; G06F 9/4401; G06F 21/572
See application file for complete search history.

(56) References Cited

U.S. PATENT DOCUMENTS

| 5,844,986 | A | * | 12/1998 | Davis | .................... G06F 21/572 |
| | | | | | 713/187 |
| 6,026,016 | A | * | 2/2000 | Gafken | ............... G06F 12/1433 |
| | | | | | 365/185.04 |
| 7,017,040 | B2 | | 3/2006 | Singer et al. | |
| 7,536,536 | B1 | | 5/2009 | Joshi et al. | |
| 2004/0003265 | A1 | | 1/2004 | Freeman et al. | |
| 2004/0064457 | A1 | | 4/2004 | Zimmer et al. | |
| 2007/0033387 | A1 | | 2/2007 | Arnez et al. | |

(Continued)

FOREIGN PATENT DOCUMENTS

| EP | 2339494 A1 | 6/2011 |
| WO | WO-2014/175867 | 10/2014 |

OTHER PUBLICATIONS

Cooper, et al; "BIOS Protection Guidelines", < http://csrc.nist.gov/publications/nistpubs/800-147/NIST-SP800-147-April2011.pdf >, Apr. 2011 (26 pages).

(Continued)

*Primary Examiner* — Terrell S Johnson
(74) *Attorney, Agent, or Firm* — Trop, Pruner & Hu PC (57) ABSTRACT

It is determined whether an updated first boot phase code is present. The updated first boot phase code is validated. In response to the validating, a current version of the first boot phase code is updated using the updated first boot phase code.

20 Claims, 5 Drawing Sheets

(56) References Cited

U.S. PATENT DOCUMENTS

| | | |
|---|---|---|
| 2007/0055969 A1 | 3/2007 | Yang |
| 2008/0005359 A1 | 1/2008 | Khosravi et al. |
| 2009/0106543 A1* | 4/2009 | Pekny ................. G06F 12/0246 713/2 |
| 2009/0217023 A1 | 8/2009 | Griech et al. |
| 2009/0271602 A1 | 10/2009 | Burks, III et al. |
| 2009/0327684 A1 | 12/2009 | Zimmer et al. |
| 2013/0219191 A1* | 8/2013 | Wishman .............. G06F 21/572 713/189 |

OTHER PUBLICATIONS

European Patent Office, extended European Search Report for EP Appl. No. 13890419 dated Feb. 8, 2017 (8 pages).

\* cited by examiner

UPDATING BOOT CODE

BACKGROUND

A computing system can include code to perform various startup functions of the computing system. This code can include Basic Input/Output System (BIOS) code. BIOS code can be the subject of attacks by malware in the computing system or from an external service. As a result of an attack, the BIOS code can become compromised.

BRIEF DESCRIPTION OF THE DRAWINGS

Some implementations are described with respect to the following figures.

DETAILED DESCRIPTION

System code used to perform startup of a computing system can include system firmware, which can be in the form of machine-readable instructions executable on a processor (or processors) of the computing system. "System firmware" can refer to any machine-readable instructions that are executed during startup of a computing system. Examples of computing systems include desktop computers, notebook computers, tablet computers, personal digital assistants (PDAs), smartphones, game appliances, server computers, storage nodes, network communication nodes, and so forth.

System firmware can include Basic Input/Output System (BIOS) code, which can initialize various components of the computing system, and load an operating system (OS) of the computing system. The BIOS code can perform checking of hardware components to ensure that the hardware components are present and functioning properly. This can be part of a power-on self-test (POST) procedure, for example. After the POST procedure, the BIOS code can progress through the remainder of a booting sequence, after which the BIOS code can load and pass control to the OS. BIOS code can include traditional BIOS code, or alternatively, Unified Extensible Firmware Interface (UEFI) code. In some examples, the BIOS code can include a runtime portion that is executed after the OS loads.

The system firmware can be stored in non-volatile memory, such as a flash memory or any other persistent memory that is programmable. System firmware may be the subject of tampering by malware or other entities, which can cause the firmware to be compromised. For example, the system firmware can be corrupted such that it can no longer execute without error, or the system firmware may be modified such that the system firmware performs unauthorized tasks.

To protect system firmware from tampering, memory regions storing executable portions of the system firmware may be locked. Even with the ability to lock such memory regions, it may still be possible to compromise system firmware as the system firmware is updated. For example, the vendor of the system firmware may release updates to address various issues (e.g. bugs) or to add new features. To allow a portion of the system firmware to be updated, the respective memory region would have to be unlocked, which can make the unlocked memory region vulnerable to tampering by malware.

In accordance with some implementations, secure update techniques or mechanisms are provided to allow for portions of system firmware to be securely updated. The secure update techniques or mechanisms can employ a multi-phase update procedure for updating at least a portion of system firmware. In the multi-phase update procedure, a first memory region is unlocked to allow for a first portion of system firmware in the first memory region to be updated, while at least another memory region containing other portion(s) of system firmware remain(s) locked, to protect the other memory region(s) from tampering during update of the first system firmware portion in the first memory region. Subsequently, after update, the first memory region can be locked, and another memory region can be unlocked to update the system firmware portion in the other unlocked memory region.

Although reference is made to "system firmware" in the present discussion, it is noted that secure update techniques or mechanisms according to some implementations can be applied to other types of boot code that can be used for performing startup functions of a system.

In accordance with some implementations, a hardware locking mechanism is employed to lock certain regions of memory that store portions of the system firmware. Hardware locking provides a more secure protection of the regions of the memory, to protect against tampering of system firmware.

Figure 1:
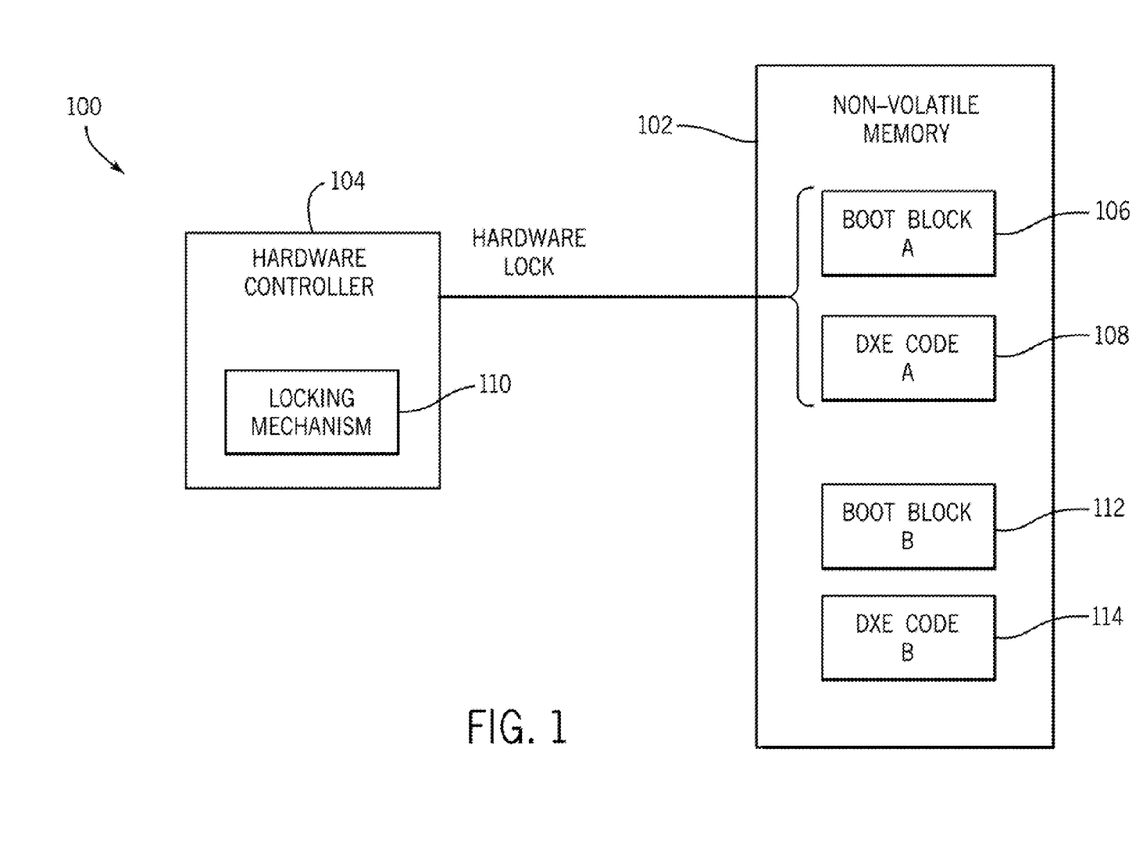
FIG. 1 is a block diagram of an example system according to some implementations.

FIG. 1 is a block diagram of an example system 100 that includes a non-volatile memory 102 and a hardware controller 104. The non-volatile memory 102 can be implemented as one or multiple memory devices. A non-volatile memory is a memory that does not lose its content when power is removed from the system 100. Examples of the non-volatile memory 102 include flash memory or any other memory (e.g. battery-backed dynamic or static random access memory, phase change memory, disk-based storage, etc.) that is programmable and that maintains its content when power is removed from the system 100.

The hardware controller 104 includes logic to perform specified functions of the computing system 100, such as video functions, bus interface functions, memory controller functions, and so forth. For example, the hardware controller 104 can include an input/output (I/O) controller, such as a Platform Controller Hub (PCH) from Intel Corporation. The PCH can include various functions, including a display interface to a graphics subsystem, a system bus interface to a system bus to which various I/O devices can be connected, and so forth. In other examples, other types of I/O controllers can be used. The I/O controller is part of the core logic of the computing system 100, where the core logic is implemented with a chipset that can include one or multiple integrated circuit (IC) chips.

As depicted in FIG. 1, different portions of system firmware are stored in respective regions of the non-volatile memory 102. Although the non-volatile memory 102 is represented as a single box in FIG. 1, it is noted that the non-volatile memory 102 can be implemented with one or multiple memory devices or memory partitions.

A first system firmware portion is a boot block, which is an initial portion of the system firmware that is executed when the system 100 first starts up. The boot block is executed first before the rest of the system firmware is allowed to execute. The boot block can be used to check the integrity of the system firmware, as well as to perform other initial functions. If the boot block confirms the integrity of the system firmware, then the boot block can pass control to another portion of the system firmware.

In some examples, the boot block is also referred to as a Pre-Extensible Firmware Interface (Pre-EFI) Initialization (PEI) code of the system firmware.

A different portion of system firmware is referred to as a Driver Execution Environment (DXE) code, which is executed after execution of the boot block. The DXE code is used to initialize various components of the system 100, such as a processor, a chipset, and other components.

More generally, instead of a boot block and DXE code, reference is made to a first boot phase code, a second boot phase code, and so forth, which are executed during respective boot phases of a boot procedure. The boot block can be an example of a first boot phase code, the DXE code can be an example of a second boot phase code, and so forth. The first boot phase code is executed first upon system startup, followed by subsequent boot phase code(s).

In the example of FIG. 1, multiple instances of the boot block (boot block A and boot block B) are stored in respective different memory regions of the non-volatile memory 102, and multiple instances of the DXE code (DXE code A ands DXE code B) are stored in respective different memory regions of the non-volatile memory 102. More specifically, boot block A is stored in a first memory region 106 and DXE code A is stored in a second memory region 108. The memory regions 106 and 108 can be hardware locked by the hardware controller 104. More specifically, the hardware controller 104 includes a locking mechanism 110 that is used to perform hardware locking (also referred to as chipset locking) of the memory regions 106 and 108.

In hardware locking, hardware is used to control whether a write is allowed to a particular memory region. For example, the locking mechanism 110 can access protected range registers (or other storage elements) that can store information identifying the memory regions to be locked. The content of the protected range registers can be programmed by the system firmware. Upon receiving a write request to an address that is within an address range indicated by the protected range registers, the locking mechanism 110 blocks the respective write from occurring.

Once the memory regions 106 and 108 are hardware locked by the locking mechanism 110, system firmware portions (boot block A and DXE code A) stored in the locked memory regions 106 and 108 cannot be updated. The secure updating techniques or mechanisms according to some implementations are able to perform the multi-phase update procedure that allows the appropriate memory region(s) 106 and/or 108 to be unlocked to allow the respective system firmware portion to be updated.

In some implementations, in addition to hardware locking, system management mode (SMM) locking can also be implemented. With SMM locking, updates of system firmware are performed in SMM mode. The system 100 enters SMM mode in response to activation of a system management interrupt (SMI). In the SMM mode, a system firmware handler (e.g. BIOS handler) is invoked, which is involved in performing the system firmware update.

In other implementations, SMM locking is not used.

The non-volatile memory 102 also includes memory regions 112 and 114 for storing boot block B and DXE code B, respectively. In some examples, the memory regions 112 and 114 are not locked by the locking mechanism 110. When updates are available for the boot block and DXE code, the updated boot block and updated. DXE code can be stored as (or replace) boot block B and DXE code B in the memory regions 112 and 114, respectively.

The secure updating techniques or mechanisms according to some implementations, can use the updated boot block and updated DXE code in the memory regions 112 and 114 to update boot block A and DXE code A, respectively, which are the current versions of the boot block and DXE code.

The secure updating mechanisms according to some implementations can be provided in the boot block or other portion of system firmware. Alternatively, the secure updating mechanisms can be implemented in other code, or implemented using a hardware control circuit (e.g. the hardware controller 104).

The updated boot block and updated DXE code (provided into the memory regions 112 and 114, respectively) can each be signed with a respective digital signature. The digital signature is used to confirm that the updated boot block or updated DXE code is indeed authentic and from a trusted source. For example, the updated boot block or updated DXE code can be signed by applying a cryptographic computation using a key (e.g. a private key). The signed code can then be decrypted using another key (e.g. a public key).

In addition, each of boot block A, DXE code A, boot block B, and DXE code B contains respective version information to indicate the respective version of the code. As the boot block or DXE code is updated, the respective version information is also updated to allow the version of the boot code or DXE code to be determined.

Figure 2:
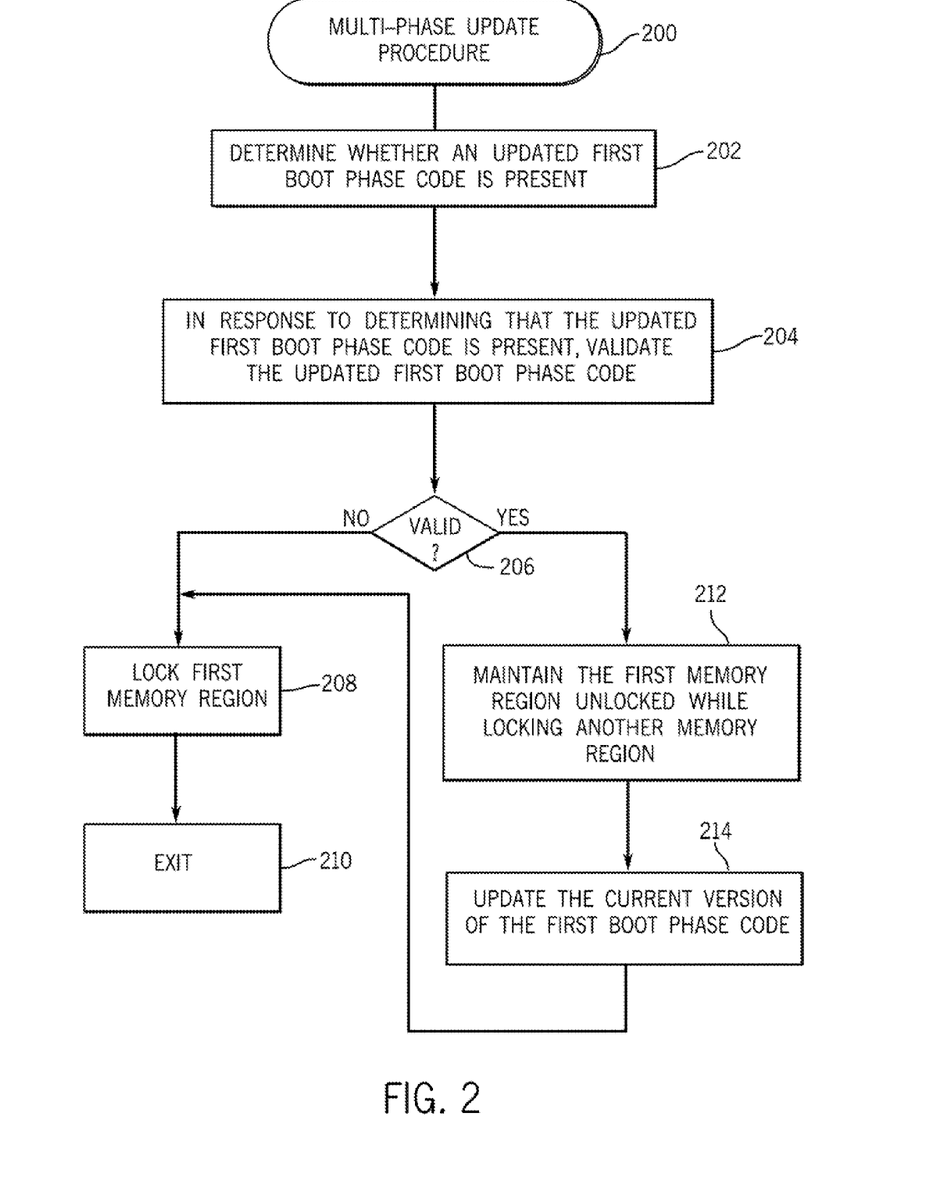
FIGS. 2-4 are flow diagrams of various multiphase update procedures according to some implementations.

FIG. 2 is a flow diagram of an example multi-phase update procedure 200 for updating a current version of a system firmware portion, such as boot block A and/or DXE code A depicted in FIG. 1. The multi-phase update procedure 200 can be performed by boot block A that is executed on one or multiple processors. In other implementations, the multi-phase update procedure 200 can be performed by a different entity.

The multi-phase update procedure 200 determines (at 202) whether an updated first boot phase code is present. The updated first boot phase code is for updating a current version of the first boot phase code stored in a first memory region. For example, the current version of the first boot phase code can be boot block A stored in the memory region 106, and the updated first boot phase code can be boot block B stored in the memory region 112. Alternatively, the first boot phase code can be another portion of system firmware. In some examples, determining whether the updated first boot phase code is present is performed during a first boot phase of a boot procedure in a system. The current version of the first boot phase code executes during the first boot phase.

In response to determining that the updated first boot phase code is present, the multi-phase update procedure 200 validates (at 204) the updated first boot phase code. For example, the validation can be based on the digital signature associated with the signed updated first boot phase code.

The multi-phase update procedure 200 determines (at 206) whether he validating indicates that the updated first boot phase code is valid. if not, the procedure 200 locks (at 208) the first memory region (e.g. the memory region 106 storing boot block A) that contains the current version of the first boot phase code, and exits (at 210) without updating the current version of the first boot phase code.

However, if the validating indicates that the updated first boot phase code is valid, then the procedure 200 maintains (at 212) the first memory region unlocked while locking another memory region. The other memory region is for storing another boot phase code, such as the memory region 108 for storing DXE code A.

The multi-phase update procedure 200 then updates (at 214) the current version of the first boot phase code in the unlocked first memory region using the updated first boot phase code. After the updating, the procedure 200 locks (at 208) the first memory region and exits (at 210).

Although not shown in FIG. 2, the multi-phase update procedure 200 can additionally perform further updating of other portions of the system firmware, including DXE code A in the memory region 108, using updated DXE code B in the memory region 114.

Figure 3:
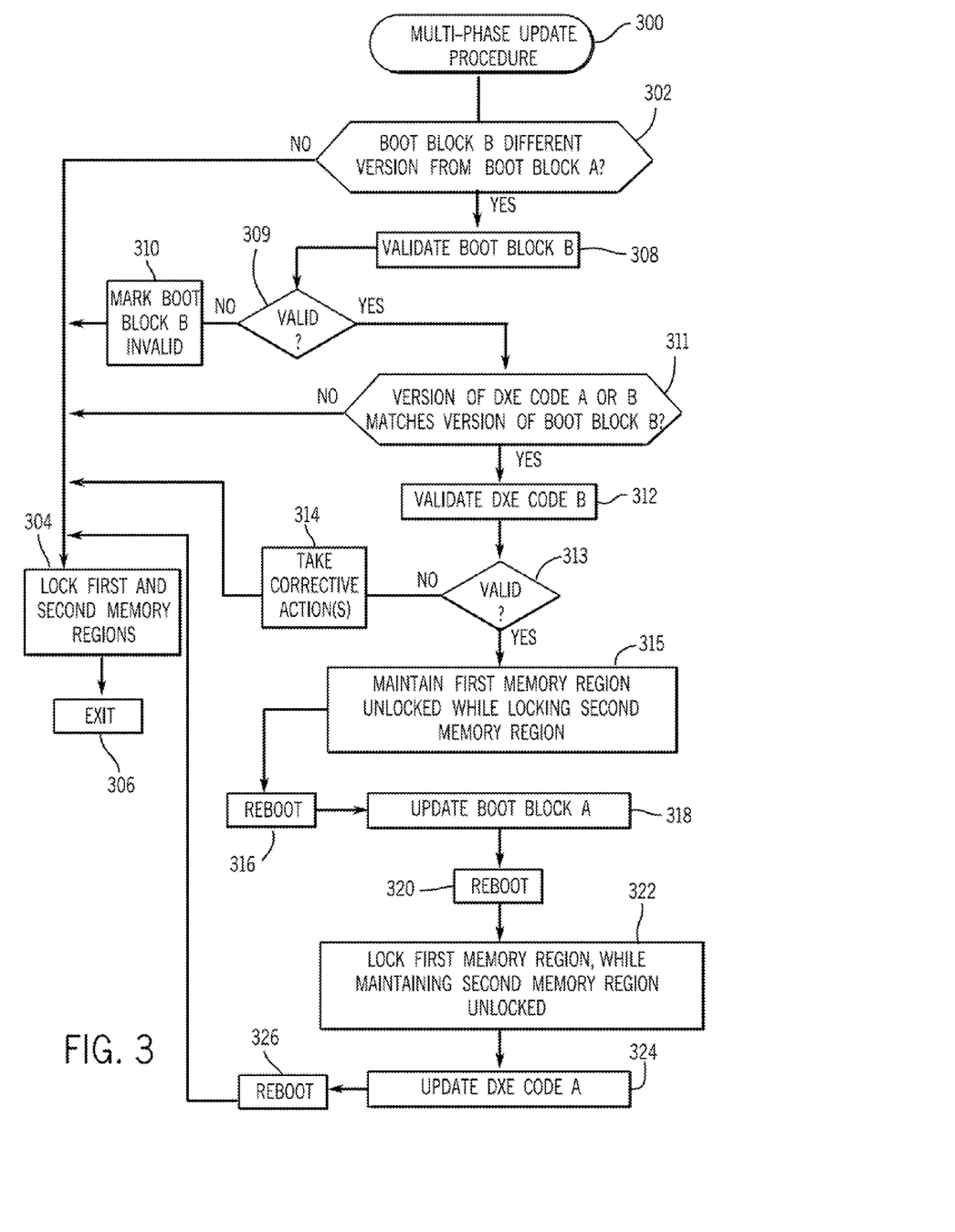

FIG. 3 is a flow diagram of a multi-phase update procedure 300 according to alternative implementations. The multi-phase update procedure 300 is used for updating multiple portions of system firmware, including boot block A and DXE code A, for example. The multi-phase update procedure 300 can be performed by boot block A, for example. In other implementations, the multi-phase update procedure 300 can be performed by a different entity.

The multi-phase update procedure 300 determines (at 302) whether boot block B is of a different version from boot block A (based on comparing version information of boot block B with version information of boot block A). If not, the procedure 300 locks (at 304) the memory regions 106 and 108, and exits (at 306) without performing an update of boot block A.

If boot block B is of a different version from boot block A, then the procedure 300 validates (at 308) boot block B, using a digital signature of boot block B. If the validating indicates (at 309) that boot block B is not valid, then boot block B is marked (at 310) as invalid, such as by using a marker within the metadata for boot block B. Marking boot block B as invalid prevents another validity check of boot block B on the next system boot. In some examples, invalid boot block B can be rolled back to boot block A, by replacing boot block B with boot block A. The procedure 300 then proceeds to tasks 304 and 306 (and no update is performed).

However, if the validating indicates (at 309) that boot block B is valid, then the multi-phase update procedure 300 determines (at 311) whether a version of either DXE code A or DXE code B matches a version of boot block B (based on comparing the version information of DXE code A or B with the version information of boot block B). If neither DXE code A nor DXE code B matches the version of boot block B tasks 304 and 306 are performed (and no update is performed).

However, if the version of DXE code A or DXE code B matches the version of boot block B, the procedure 300 validates (at 312) DXE code B, by using the digital signature of DXE code B. If the validating of DXE code B indicates (at 313) that DXE code B is not valid, then corrective action(s) can be taken (at 314). The corrective action(s) can include rolling back invalid DXE code B based on DXE code A, by replacing DXE code B with DXE code A. Next, tasks 304 and 306 are performed (and no update is performed).

In another scenario, if DXE B is invalid and matches the version of the updated boot block B, then boot block B can be flagged as invalid, and DXE code B is rolled back from DXE code A. The update is also not performed in this scenario.

If the validating indicates (at 313) that DXE code B is valid, then the multi-phase update procedure 300 maintains (at 315) the memory region 106 unlocked (because a valid update is pending) while locking memory region 108, to prevent tampering with the memory region 108 during update of boot block A in the memory region 106.

In some examples, the state of the system 100 can be saved, and the system 100 can be rebooted (at 316) so that the hardware lock of the memory region 106 can be disabled for the duration of a single boot.

Next, after the reboot in which the hardware lock of the memory region 106 is disabled, the multi-phase update procedure 300 updates (at 318) boot block A in the unlocked memory region 106 using updated boot block B. Note that at this time, the memory region 108 storing DXE code A remains hardware locked.

The system is then rebooted (at 320). On the next boot, the memory region 106 containing the updated boot block A is locked (at 322), while the memory region 108 containing the current version of DXE code (DXE code A) is maintained unlocked. DXE code A in the memory region 108 is then updated (at 324) using the updated DXE code (DXE code B). A reboot of the system 100 is then performed (at 326). On the next boot, the memory regions 106 and 108 are locked (at 304), and the update procedure 300 exits (at 306).

In some examples, a failsafe mechanism can be provided. The following scenario may occur due attack by malware or due to a different cause. If boot block B was determined to be valid and boot block A was updated (as discussed above), but it is later determined that DXE A is still the old version while DXE B is the new version, and it is subsequently determined that DXE B is invalid, the system can roll back DXE B from the valid DXE A, and can warn a user that the boot block version and the DXE code version are not in synchronization, In this case, another update can be performed to re-synchronize the versions of the boot block and DXE code.

Figure 4:
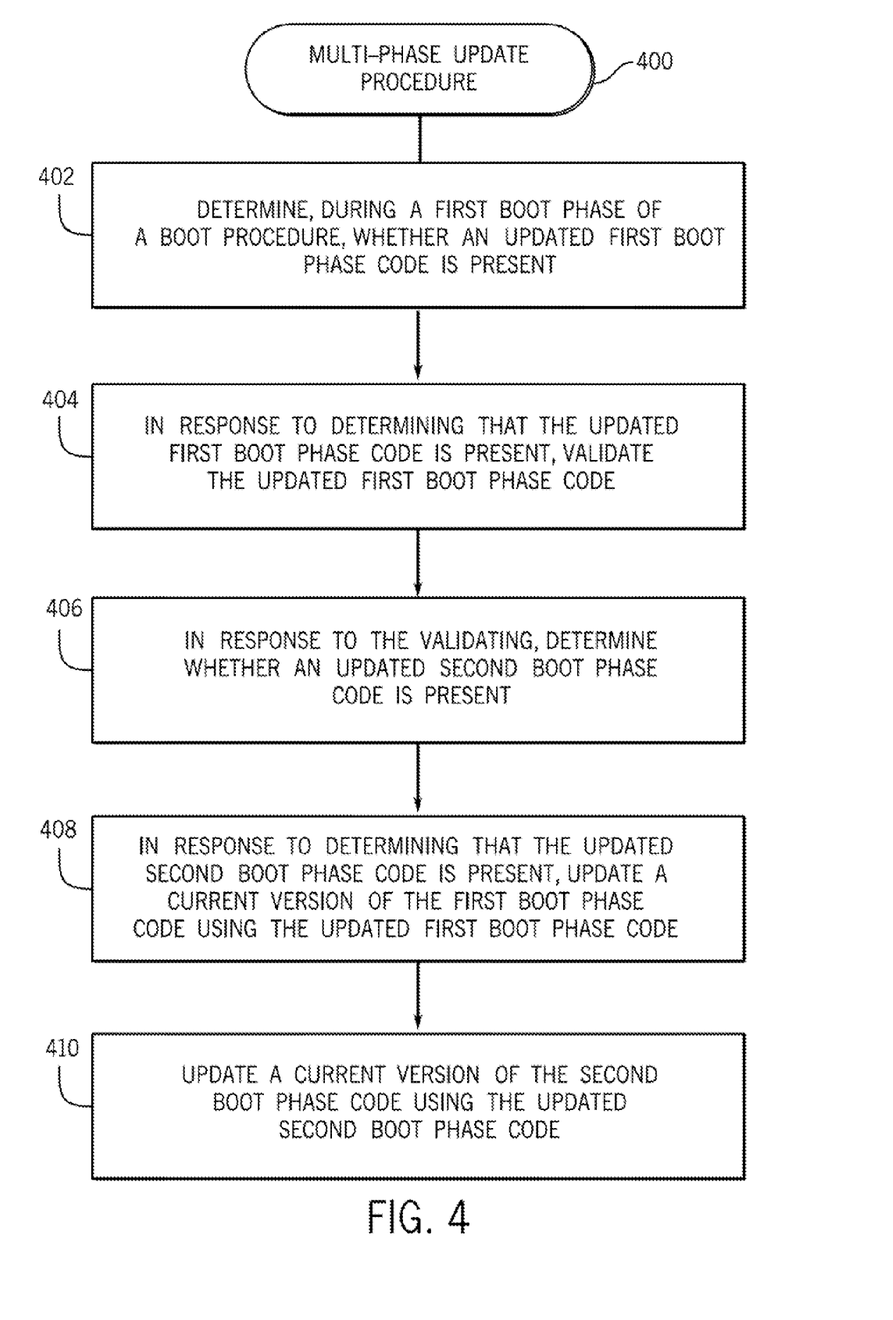

FIG. 4 is a flow diagram of a multi-phase update procedure 400 according to further implementations. The multi-phase update procedure 400 can be considered a simplified form of the multi-phase update procedure 300 of FIG. 3. The multi-phase update procedure 400 determines (at 402) during a first boot phase of a boot procedure in a system, whether an updated first boot phase code (e.g. an updated boot block) is present. In response to determining that the updated first boot phase code is present, the multi-phase update procedure 400 validates (at 404) the updated first boot phase code. In response to the validating, the multi-phase update procedure 400 determines (at 406) whether an updated second boot phase code is present, where the updated second boot phase code is executable in a second, different boot phase of the boot procedure. The updated second boot phase code can be an updated DXE code, for example.

In response to determining that the updated second boot phase code is present, a current version of the first boot phase code is updated (at 408) using the updated first boot phase code. Subsequently, a current version of the second boot phase code can be updated (at 410) using the updated second boot phase code.

Figure 5:
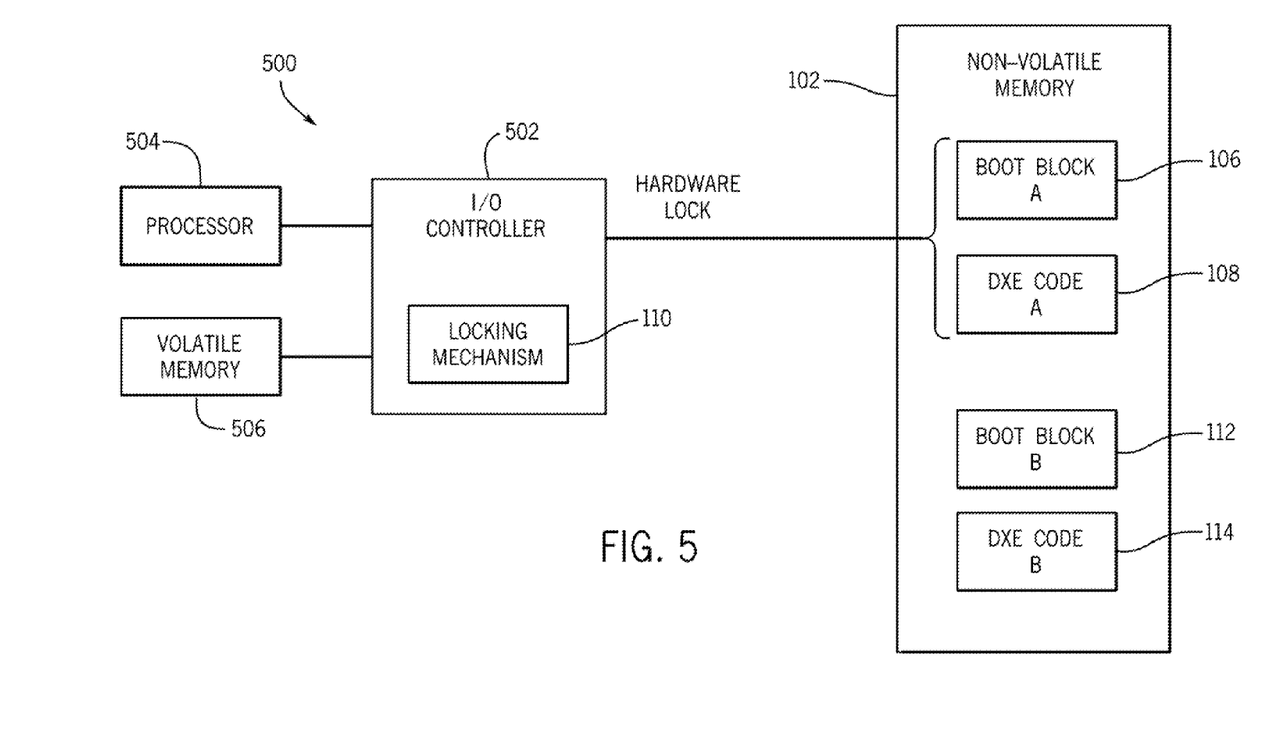
FIG. 5 is a block diagram of an example system according to further implementations.

FIG. 5 is a block diagram of an example system 500 according to further implementations. The system 500 includes the non-volatile memory 102 (similar to that depicted in FIG. 1. In addition, the system 500 includes an I/O controller 502, which includes the locking mechanism 110 for performing hardware locking of the memory regions 106 and 108 in the non-volatile memory 102.

The system 500 additionally includes one or multiple processors 504. In addition, a volatile memory 506 can be included in the system 500. Executable code, Including system firmware, can be loaded into the volatile memory 506 for execution by the processor(s) 504. A processor can include a microprocessor, microcontroller, processor module or subsystem, programmable integrated circuit, programmable gate array, or another control or computing device.

The various memories described in this disclosure can include computer-readable or machine-readable storage media. The storage media can include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
   determining whether an updated first boot phase code is present, the updated first boot phase code for updating a current version of a first boot phase code stored in a first memory region;
   in response to determining that the updated first boot phase code is present, validating the updated first boot phase code;
   in response to the validating, maintaining the first memory region unlocked while locking a second memory region, the second memory region storing a second boot phase code;
   updating the current version of the first boot phase code in the unlocked first memory region using the updated first boot phase code; and
   after the updating, locking the first memory region.

2. The method of claim 1, wherein locking the first memory region and locking the second memory region comprise hardware locking the first memory region and hardware locking the second memory region.

3. The method of claim 1, wherein determining whether the updated first boot phase code is present is performed during a first boot phase of a boot procedure in a system, the current version of the first boot phase code executing during the first boot phase.

4. The method of claim 3, further comprising:
   after locking the first memory region, causing unlocking of the second memory region;
   updating the second boot phase code in the unlocked second memory region; and
   after updating the second boot phase code, locking the second memory region.

5. The method of claim 1, wherein determining whether the updated first boot phase code is present comprises determining whether an updated boot block code is present.

6. The method of claim 5, wherein the second boot phase code includes a driver execution environment (DXE) phase code.

7. The method of claim 1, wherein the first memory region and the second memory region are part of non-volatile memory.

8. The method of claim 1, wherein validating the updated first boot phase code comprises validating using a digital signature.

9. The method of claim 1, further comprising:
   in response to determining that the updated first boot phase code is invalid, locking the first memory region to prevent updating the current version of the first boot phase code.

10. The method of claim 1, further comprising:
    in response to the validating, determining whether an updated second boot phase code is present, the updated second boot phase code for updating a current version of a second boot phase code,
    wherein the updating of the current version of the first boot code phase code is further in response to determining that the updated second boot phase code is present.

11. The method of claim 10, wherein the current version of the second boot phase code is executable in a boot phase that is different from a boot phase in which the first boot phase code is executable.

12. An article comprising at least one non-transitory machine-readable storage medium storing instructions that upon execution cause a system to:
    during a first boot phase of a boot procedure in a system, determine whether updated first boot phase code is present;
    in response to determining that the updated first boot phase code is present, validate the updated first boot phase code;
    in response to the validating, determine whether updated second boot phase code is present, the updated second boot phase code executable in a second, different boot phase of the boot procedure; and
    in response to determining that the updated second boot phase code is present, update a current version of a first boot phase code executable in the first boot phase using the updated first boot phase code.

13. The article of claim 12, wherein the updated first boot phase code comprises an updated boot block, and wherein the updated second boot phase code comprises a driver execution environment (DXE) phase code.

14. The article of claim 12, wherein the instructions upon execution cause the system to further:
    store the updated first boot phase code in a first region of memory unlocked by a hardware controller; and
    store the current version of the first boot phase code in a second region of the memory lockable by the hardware controller.

15. The article of claim 14, wherein the instructions upon execution cause the system to further:
    in response to the validating indicating that the updated first boot phase code is valid, maintain the second region of the memory unlocked to allow for update of the current version of the first boot phase code in the second region; and in response to the validating indicating that the updated first boot phase code is not valid, or in response to determining that the updated second boot phase code is not present, lock the second region of the memory without updating the current version of the first boot phase code.

16. The article of claim 15, wherein the instructions upon execution cause the system to further:

cause locking of the second region, and unlocking of a third region of the memory lockable by the hardware controller; and update a current version of a second boot phase code in the unlocked third region using the updated second boot phase code.

17. A system comprising:

a non-volatile memory including a first region for storing a first boot phase code and a second region for storing a second boot phase code;

at least one processor to:

determine whether an updated first boot phase code is present;

in response to determining that the updated first boot phase code is present, validate the updated first boot phase code;

in response to the validating indicating that the updated first boot phase code is valid:

maintain the first region unlocked, while causing hardware locking of the second region;

update the first boot phase code in the unlocked first region using the updated first boot phase code; and after the updating, lock the first region.

18. The system of claim 17, wherein the at least one processor is to further:

in response to the validating indicating that the updated first boot phase code is valid, determine whether updated second boot phase code is present, wherein the updating is further in response to determining that the updated second boot phase code is present.

19. The system of claim 17, wherein the at least one processor is to further:

in response to the validating indicating that the updated first boot phase code is invalid, lock the first region to prevent updating the first boot phase code in the first region.

20. The system of claim 17, wherein the validating is based on a digital signature associated with a signed version of the updated first boot phase code.

* * * * *

UNITED STATES PATENT AND TRADEMARK OFFICE
CERTIFICATE OF CORRECTION

PATENT NO. : 9,983,886 B2
APPLICATION NO. : 14/892223
DATED : May 29, 2018
INVENTOR(S) : Baraneedharan Anbazhagan et al.

Page 1 of 1

It is certified that error appears in the above-identified patent and that said Letters Patent is hereby corrected as shown below:

In the Claims

In Column 8, Line 29, Claim 10, after "boot" delete "code".

Signed and Sealed this
Second Day of October, 2018

Andrei Iancu
*Director of the United States Patent and Trademark Office*